(12) United States Patent
Kozawa et al.

(10) Patent No.: US 11,485,841 B2
(45) Date of Patent: Nov. 1, 2022

(54) POLYOLEFIN RESIN COMPOSITION, MOLDED ARTICLE, AND OUTER PANEL FOR A VEHICLE

(71) Applicant: FURUKAWA ELECTRIC CO., LTD., Tokyo (JP)

(72) Inventors: Eiji Kozawa, Tokyo (JP); Jae Kyung Kim, Tokyo (JP); Yasuo Nakajima, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/492,629

(22) Filed: Apr. 20, 2017

(65) Prior Publication Data

US 2017/0218188 A1 Aug. 3, 2017

Related U.S. Application Data

(63) Continuation of application No. PCT/JP2015/079706, filed on Oct. 21, 2015.

(30) Foreign Application Priority Data

Oct. 21, 2014 (JP) .............................. JP2014-214836

(51) Int. Cl.
| | | |
|---|---|---|
| C08L 23/12 | (2006.01) | |
| C08L 1/02 | (2006.01) | |
| B60J 5/10 | (2006.01) | |
| B60J 5/04 | (2006.01) | |
| C08L 55/02 | (2006.01) | |
| B62D 29/04 | (2006.01) | |
| B32B 27/08 | (2006.01) | |
| B32B 27/32 | (2006.01) | |
| B60R 13/02 | (2006.01) | |
| B60R 19/03 | (2006.01) | |
| B62D 35/00 | (2006.01) | |

(52) U.S. Cl.
CPC .............. *C08L 23/12* (2013.01); *B32B 27/08* (2013.01); *B32B 27/32* (2013.01); *B60J 5/0481* (2013.01); *B60J 5/10* (2013.01); *B60R 13/0243* (2013.01); *B60R 19/03* (2013.01); *B62D 29/04* (2013.01); *B62D 35/007* (2013.01); *C08L 55/02* (2013.01); *B32B 2250/242* (2013.01); *B32B 2262/062* (2013.01); *B32B 2605/08* (2013.01); *B60J 5/101* (2013.01); *B60Y 2410/122* (2013.01); *C08L 1/02* (2013.01); *C08L 2205/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0074174 A1* | 4/2006 | Oobayashi | ............ | C08F 255/00 524/502 |
| 2012/0010351 A1* | 1/2012 | Araki | ...................... | C08L 23/16 524/525 |
| 2012/0214911 A1 | 8/2012 | Yano et al. | | |
| 2015/0105499 A1 | 4/2015 | Yano et al. | | |
| 2015/0376298 A1 | 12/2015 | Nakatsubo et al. | | |
| 2016/0002461 A1 | 1/2016 | Tsujii et al. | | |
| 2016/0237277 A1* | 8/2016 | I | ............................ | C08L 71/123 |
| 2017/0313858 A1* | 11/2017 | Tanaka | ..................... | C08J 5/005 |

FOREIGN PATENT DOCUMENTS

| | | | |
|---|---|---|---|
| JP | 2002-240566 A | | 8/2002 |
| JP | 2005-60678 A | | 3/2005 |
| JP | 2006-44264 A | | 2/2006 |
| JP | 2007056176 A | * | 3/2007 |
| JP | 2008-24795 A | | 2/2008 |
| JP | 2009167249 A | * | 7/2009 |
| JP | 2009-196435 A | | 9/2009 |
| JP | 2009-532574 A | | 9/2009 |
| JP | 2010043204 A | * | 2/2010 |
| JP | 2011-195615 A | | 10/2011 |
| JP | 2012-207100 A | | 10/2012 |
| JP | 2012-214563 A | | 11/2012 |
| JP | 2013-230716 A | | 11/2013 |
| JP | 2013-245343 A | | 12/2013 |
| WO | WO 2008/054850 A2 | | 5/2008 |
| WO | WO 2011/049162 A1 | | 4/2011 |
| WO | WO 2013/133093 A1 | | 9/2013 |
| WO | WO 2013/133156 A1 | | 9/2013 |
| WO | WO 2014/119745 A1 | | 8/2014 |
| WO | WO 2014/133019 A1 | | 9/2014 |

OTHER PUBLICATIONS

Pollanen, M., Cellulose reinforced high density polyethylene composites, Composites Science and Technology, vol. 76, pp. 21-22, 26, accessed on Aug. 13, 2018 (Year: 2013).*
Espacent translation of JP-2010043204-A, p. 1&8, accessed on Aug. 13, 2018 (Year: 2010).*
Espacent translation of JP-2007056176-A, pp. 4-5, accessed on Aug. 13, 2018 (Year: 2007).*
Ehrenstein, Gottfried W. Riedel, Gabriela Trawiel, Pia. Thermal Analysis of Plastics—Theory and Practice—4.1.1 Introduction. (pp. 173). Hanser Publishers. Retrieved from: https://app.knovel.com/hotlink/pdf/id:kt010XENM1/thermal-analysis-plastics/thermomech-introduction (Year: 2004).*
Espacenet translation of JP-2009167249-A, accessed on Jan. 5, 2020. (Year: 2013).*

(Continued)

*Primary Examiner* — Jeremy R Pierce
*Assistant Examiner* — Christine X Nisula
(74) *Attorney, Agent, or Firm* — Birch, Stewart, Kolasch & Birch, LLP

(57) ABSTRACT

A polyolefin resin composition, containing: a polyolefin resin; and cellulose microfibrils, in which a content of the cellulose microfibrils is 0.5 to 20 parts by mass, with respect to 100 parts by mass of an entire resin component in the polyolefin resin composition, a molded article and a back door for a vehicle.

6 Claims, No Drawings

(56) References Cited

OTHER PUBLICATIONS

International Search Report for PCT/JP2015/079706 (PCT/ISA/210) dated Dec. 1, 2015.
Written Opinion of the International Searching Authority for PCT/JP2015/079706 (PCT/ISA/237) dated Dec. 1, 2015.
Japanese Office Action, dated Aug. 6, 2019, for Japanese Application No. 2016-555255, with an English machine translation.
Japanese Office Action dated Jun. 30, 2020 for Application No. 2016-555255 with an English translation.

* cited by examiner

POLYOLEFIN RESIN COMPOSITION, MOLDED ARTICLE, AND OUTER PANEL FOR A VEHICLE

CROSS-REFERENCE TO RELATED APPLICATIONS

This application is a continuation of PCT/JP2015/79706 filed on Oct. 21, 2015 which claims benefit of Japanese Patent Application No. 2014-214836 filed on Oct. 21, 2014, the subject matters of which are incorporated herein by reference in their entirety.

TECHNICAL FIELD

The present invention relates to a polyolefin resin composition, a molded article, and an outer panel for a vehicle.

BACKGROUND ART

In vehicles such as automobiles, from a viewpoint of saving resources and the like, studies have been made on weight reduction for the purpose of improving fuel consumption. Furthermore, in order not only to simply achieve weight reduction, but also to improve safety and quality, a resin is used to replace a material of an outer panel, and such a research has been actively performed (see Patent Literatures 1 to 3). In such an outer panel, high mechanical strength and impact resistance are required.

Therefore, glass fibers, aramid fibers, carbon fibers, and the like have been developed as a material for reinforcing a resin.

However, the glass fibers have poor surface properties, and cannot be directly used as an exterior material for a vehicle. Conversely, if an attempt is made on applying the resin as a surface member, rigidity is insufficient. As a result, different kinds of raw materials are to be compounded and used, and therefore poor performance is caused in bonding and/or appearance from a difference in a coefficient of thermal expansion of each raw material in several cases.

Furthermore, in the vehicles, a decorative molded body is required to be introduced on a surface for decoration or design ability (see Patent Literature 4).

In addition thereto, desire has been recently expressed also for the reinforcing material which reduces an environmental load, and in addition thereto, is produced by using a raw material having no need to worry about depletion of resources.

CITATION LIST

Patent Literatures

Patent Literature 1: JP-A-2006-44264 ("JP-A" means unexamined published Japanese patent application)
Patent Literature 2: JP-A-2009-196435
Patent Literature 3: JP-A-2013-230716
Patent Literature 4: JP-T-2009-532574 ("JP-T" means published searched patent publication)

SUMMARY OF INVENTION

Technical Problem

In view of the situation as described above, the present inventors have studied, in various manners, particularly on an outer panel as a material for a vehicle. As a result, the present inventors have found that development of a stable composite material, which can be uniformly dispersed, is important. In a case where different raw materials are applied for an outer panel and an inner panel, a problem of break-through or the like occurs by a difference in rigidity therebetween, and therefore it is important that the same raw material is applied thereto. Furthermore, the present inventors have found that easy coloring of the raw material is also important in order to simplify painting.

Accordingly, the present invention is contemplated for providing: a polyolefin resin composition capable of satisfying both weight reduction and rigidity, having a low coefficient of linear thermal expansion at room temperature and excellent flowability at a high temperature and also having excellent appearance and colorability; a molded article; and a back door for a vehicle.

In particular, the present invention is contemplated for providing a polyolefin resin composition having a surface smooth enough to be used for an outer panel for a vehicle, good texture, being capable of coloring by a usual method, and capable of simplifying painting, and a molded article thereof. Further, the present invention is contemplated for providing a polyolefin resin composition capable of being used as a stable composite material due to a small coefficient of linear thermal expansion and small anisotropy, and being hard to cause a problem of penetration because of capability of producing both an outer panel and an inner panel of a back door for a vehicle by using the same raw material, and having a high degree of freedom of design, and a molded article thereof.

Solution to Problem

The present inventors diligently continued to conduct study, and as a result, the present inventors found that the above-described problems can be solved by using a specific amount of cellulose microfibrils as a reinforcing material, and a polyolefin resin as a main resin component, and completed the present invention.

That is, the present invention provides the following means.

(1) A polyolefin resin composition, comprising:
a polyolefin resin; and
cellulose microfibrils,
wherein a content of the cellulose microfibrils is 0.5 to 20 parts by mass, with respect to 100 parts by mass of an entire resin component in the polyolefin resin composition.
(2) The polyolefin resin composition described in the above item (1), having a coefficient of linear thermal expansion of 85 ppm/K or less.
(3) The polyolefin resin composition described in the above item (1) or (2), wherein the polyolefin resin is a polyethylene resin, a polypropylene resin, or an acrylonitrile-butadiene-styrene copolymer resin.
(4) A molded article obtained by molding the polyolefin resin composition described in any one of the above items (1) to (3).
(5) The molded article described in the above item (4), which is an outer panel for a vehicle.
(6) The molded article described in the above item (4) or (5), which is a front panel of a rear spoiler for a vehicle, or a fender.
(7) A back door for a vehicle, comprising the molded article described in the above item (4) or (5) as an inner panel.

(8) A back door for a vehicle, comprising the molded article described in the above item (4) or (5) as an outer panel.
(9) A back door for a vehicle, comprising the molded article described in the above item (4) or (5) as an inner panel and an outer panel.

Advantageous Effects of Invention

The present invention can provide: a polyolefin resin composition, which is capable of satisfying both weight reduction and rigidity, has a low coefficient of linear thermal expansion at room temperature and excellent flowability at a high temperature, and also has excellent appearance and colorability; a molded article; and a back door for a vehicle.

In particular, an outer panel for a vehicle, which is molded and produced by using the resin composition of the present invention, has a smooth surface and good texture, excellent colorability on resin, and is capable of simplifying painting.

Furthermore, the polyolefin resin composition of the present invention can be used as a stable composite material due to a small coefficient of linear thermal expansion and small anisotropy. Therefore, if the polyolefin resin composition of the present invention is used, both an outer panel and an inner panel of a back door for a vehicle can be easily produced by using the same raw material. Furthermore, if the polyolefin resin composition of the present invention is used, a problem of penetration by a difference in rigidity is hard to occur. Therefore, the polyolefin resin composition of the present invention has a high degree of freedom of design, and is preferable for a material for the vehicle.

In addition thereto, resources can be effectively utilized, and also an environmental load can be reduced.

Other and further features and advantages of the invention will appear more fully from the following description.

MODE FOR CARRYING OUT THE INVENTION

Embodiments of the present invention are described in detail below.

<<Polyolefin Resin Composition>>

The polyolefin resin composition of the present invention contains a polyolefin resin and cellulose microfibrils. Further, according to the necessity, the polyolefin resin composition of the present invention contains the other resin and/or additive.

<Polyolefin Resin>

The polyolefin resin used in the present invention is a polyolefin resin prepared by polymerizing at least one olefin, and the polyolefin resin may be a homopolymer or a copolymer.

The specific examples of such olefin include α-olefin having 4 to 12 carbon atoms including ethylene, propylene, isobutylene, and isobutene (1-butene), butadiene, isoprene, (meth)acrylic acid ester, (meth)acrylic acid, (meth)acrylamide, vinyl alcohol, vinyl acetate, vinyl chloride, styrene, and acrylonitrile.

In addition, specific examples of α-olefin having 4 to 12 carbon atoms include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene and 1-dodecene.

Specific examples of polyolefin resin include a polyethylene resin, a polypropylene resin, a polyisobutylene resin, a polyisobutene resin, a polyisoprene resin, a polybutadiene resin, a (meth)acrylic resin (usually referred to as an acrylic resin), a vinyl resin such as a poly(vinyl chloride) resin, a poly(meth)acrylamide resin, a polystyrene resin, an acrylonitrile-butadiene-styrene copolymer resin (ABS resin), an ethylene-(meth)acrylate copolymer and an ethylene-vinyl acetate copolymer.

Among these resins, a polyethylene resin, a polypropylene resin, and an acrylonitrile-butadiene-styrene copolymer resin (ABS resin) are preferable, and a polypropylene resin is more preferable.

The polyethylene resin includes an ethylene homopolymer, an ethylene-α-olefin copolymer, and the like. As α-olefin, 1-butene, 1-pentene, 1-hexene, and 1-octene are preferable.

Specific examples of the ethylene-α-olefin copolymer include an ethylene-1-butene copolymer, an ethylene-1-pentene copolymer, an ethylene-1-hexene copolymer, an ethylene-1-octene copolymer, and the like.

In addition, in a case where classification is made depending on density or shape, any of a high density polyethylene (HDPE), a low density polyethylene (LDPE), a very low density polyethylene (VLDPE), a linear low density polyethylene (LLDPE) and an ultra-high molecular weight polyethylene (UHMW-PE) may be used.

Specific examples of the polypropylene resin include a propylene homopolymer, a propylene-ethylene random copolymer, a propylene-α-olefin random copolymer, a propylene-ethylene-α-olefin copolymer and a propylene block copolymer (composed of a propylene homopolymer component or a copolymer component mainly composed of propylene, and a copolymer obtained by copolymerizing propylene with at least one kind of a monomer selected from ethylene and α-olefin). These polypropylene resins may be used singly or two or more kinds thereof may be used in combination.

As α-olefin used in a polypropylene resin, 1-butene, 1-pentene, 1-hexene, 4-methyl-1-pentene, 1-octene, and 1-decene are preferable, and 1-butene, 1-hexene, and 1-octene are more preferable.

Specific examples of the propylene-α-olefin random copolymer include a propylene-1-butene random copolymer, a propylene-1-hexene random copolymer, and a propylene-1-octene random copolymer.

Specific examples of propylene-ethylene-α-olefin copolymer include a propylene-ethylene-1-butene copolymer, a propylene-ethylene-1-butene copolymer, and a propylene-ethylene-1-octene copolymer.

Specific examples of the propylene block copolymer include a (propylene)-(propylene-ethylene) copolymer, a (propylene)-(propylene-ethylene-1-butene) copolymer, a (propylene)-(propylene-ethylene-1-hexene) copolymer, a (propylene)-(propylene-1-butene) copolymer, a (propylene)-(propylene-1-hexene) copolymer, a (propylene-ethylene)-(propylene-ethylene) copolymer, a (propylene-ethylene)-(propylene-ethylene-1-butene) copolymer, a (propylene-ethylene)-(propylene-ethylene-1-hexene) copolymer, a (propylene-ethylene)-(propylene-1-butene) copolymer, a (propylene-ethylene)-(propylene-1-hexene) copolymer, a (propylene-1-butene)-(propylene-ethylene) copolymer, a (propylene-1-butene)-(propylene-ethylene-1-butene) copolymer, a (propylene-1-butene)-(propylene-ethylene-1-hexene) copolymer, a (propylene-1-butene)-(propylene-1-butene) copolymer and a (propylene-1-butene)-(propylene-1-hexene) copolymer.

Among these polypropylene resins, a propylene homopolymer, a propylene-ethylene random copolymer, a propylene-1-butene random copolymer, a propylene-ethylene-1-butene copolymer, and a copolymer containing a propylene block component are preferable.

Crystallinity of the polypropylene resin is determined by a melting temperature (melting point) or stereoregularity, and adjusted according to quality required for the polyolefin resin composition of the present invention, and quality required for a molded article obtained by molding the composition.

In addition, the stereoregularity refers to an isotactic index or a syndiotactic index.

The isotactic index can be determined by a $^{13}$C-NMR method described in Macromolecules, Vol. 8, p. 687 (1975). Specifically, the isotactic index of the polypropylene resin is determined as an area fraction of an mmmm peak in a total absorption peak in a carbon region of a methyl group in a $^{13}$C-NMR spectrum.

A material having a high isotactic index has high crystallinity, and the isotactic index is preferably 0.96 or more, further preferably 0.97 or more, and still further preferably 0.98 or more.

On the other hand, the syndiotactic index can be determined by a method described in J. Am. Chem. Soc., 110, 6255 (1988) and Angew. Chem. Int. Ed. Engl., 1955, 34, 1143-1170, and a material having a high syndiotactic index has high crystallinity.

In addition, as the polyolefin resin, a modified polyolefin resin may be used, or a modified polyolefin resin may be contained in a non-modified polyolefin resin.

Examples thereof include graft modification with unsaturated carboxylic acid or a derivative thereof, and specific examples of the unsaturated carboxylic acid include maleic acid, fumaric acid, itaconic acid, acrylic acid, and methacrylic acid, and specific examples of the derivative of unsaturated carboxylic acid include maleic acid anhydride, itaconic acid anhydride, methyl acrylate, ethyl acrylate, butyl acrylate, glycidyl acrylate, methyl methacrylate, ethyl methacrylate, butyl methacrylate, glycidyl methacrylate, monoethyl maleate, diethyl maleate, monomethyl fumarate and dimethyl fumarate. Among these unsaturated carboxylic acids and/or the derivatives thereof, acrylic acid, methacrylic acid glycidyl ester and maleic anhydride are preferable.

Specific examples of (meth)acrylic resin include homopolymers or copolymers of acrylic monomer such as (meth)acrylic acid, (meth)acrylic acid ester, and acrylonitrile, and copolymers of acrylic monomer and other monomer.

Among them, specific examples of the (meth)acrylic acid ester include methyl (meth)acrylate, ethyl (meth)acrylate, propyl (meth)acrylate, butyl (meth)acrylate, (meth)acrylic acid alkyl ester having an alkyl group having 1 to 10 carbon atoms, such as 2-ethylhexyl (meth)acrylate, hydroxyalkyl (meth)acrylate such as hydroxyethyl (meth)acrylate, and (meth)acrylic acid glycidyl ester.

Specific examples of the homopolymer of the acrylic monomer or the copolymer thereof include a poly(meth)acrylate, an acrylic acid ester-methacrylic acid copolymer, and a polyacrylonitrile. Specific examples of the copolymer of the acrylic monomer with other monomer include a copolymer of a (meth)acrylic acid ester-styrene copolymer, a (meth)acrylic acid-styrene copolymer, an acrylonitrile-butadiene-styrene copolymer, an acrylonitrile-styrene copolymer, and an acrylonitrile-styrene-(meth)acrylic acid ester copolymer.

Specific examples of the vinyl resin include a vinyl chloride resin [a homopolymer of a vinyl chloride monomer (poly(vinyl chloride) resin and the like), a copolymer of a vinyl chloride monomer with other monomer (a vinyl chloride-vinyl acetate copolymer, a vinyl chloride-(meth)acrylic acid ester copolymer) and the like], a vinyl alcohol resin (a homopolymer such as poly(vinyl alcohol), a copolymer such as an ethylene-vinyl alcohol copolymer and the like), and a poly(vinyl acetal) resin such as poly(vinyl formal). These vinyl-based resins can be used singly or two or more kinds thereof can be used in combination.

Melt flow rate of a polyolefin resin is usually 0.01 to 400 g/10 minutes, and from the standpoint of enhancing mechanical strength and production stability, 1 to 400 g/10 minutes is preferable, 5 to 200 g/10 minutes is more preferable, and 10 to 150 g/10 minutes is furthermore preferable. In addition, MFR is expressed in terms of a value obtained by measuring a specimen at 230° C. and at a load of 21.2 N in accordance with A.S.T.M. D1238.

<Cellulose Microfibrils>

Cellulose is mainly accumulated in cell walls as a main component which supports a plant body to maintain life of the plant body by forming high crystallinity microfibrils with an ultrafine width of about 3 nm, in which 30 to 40 molecules of the cellulose are coiled. In the present invention, the cellulose microfibrils of such cellulose are used.

An average length (fiber length) of the cellulose microfibrils is preferably 0.03 to 500 μm, and further preferably 0.05 to 200 μm. Moreover, an average fiber diameter (diameter) is preferably 3 to 150 nm, and further preferably 4 to 100 nm. An aspect ratio is preferably 5 or more, and further preferably 10 to 1000. In addition, the aspect ratio is expressed in terms of a value obtained by dividing the average length by the average fiber diameter.

Cellulose microfibrils are broadly divided into cellulose nanofibers (CNF) and cellulose nanocrystals (CNC), currently.

The cellulose nanofibers (CNF) are a material having a width of 4 to 100 nm, a length of 5 μm or more and a high aspect ratio, and the cellulose nanocrystals (CNC) are a material of acicular crystals, and having a width of 10 to 50 nm and a length of 100 to 500 nm.

A raw material of the cellulose microfibrils is not particularly limited, and specific examples thereof include a material derived from plant, such as wood, bamboo, hemp, jute, kenaf, agricultural product remains or wastes (for example, straw of wheat, or rice plant, corn, stalks of cotton, and sugar cane), cloth, regenerated pulp, and waste paper, and a material derived from microorganisms such as bacterial cellulose and ascidian cellulose. In the present invention, wood or fibers derived from wood are preferable.

A method of producing the cellulose microfibrils is not particularly limited. For example, the cellulose microfibrils can be obtained by chemically treating a raw material of the above-described cellulose microfibrils with a chemical such as sodium hydroxide, and then forming cellulose into micronized fibers having a width in a nanometer order in a cross section by using a refiner, a twin-screw kneading extruder, a high-pressure homogenizer, a medium agitation mill, a stone mill, a grinder, a vibrating mill and/or a sand grinder.

The cellulose microfibrils can be produced, for example, by the method described in JP-T-H9-509694 or a method equivalent thereto and can also be obtained as a commercial item. Specific examples thereof include cellulose nanofibers BiNFi-s manufactured by Sugino Machine Limited.

The content of the cellulose microfibrils is 0.5 to 20 parts by mass, preferably 2.5 to 10 parts by mass, with respect to 100 parts by mass of the entire resin component in the polyolefin resin composition. Here, the term "the entire resin component" means resin components contained in the composition, but do not include the cellulose microfibrils.

In a case where a content of the cellulose microfibrils is less than 0.5 part by mass, rigidity is liable to be lacked, and in a case where the content thereof is over 20 parts by mass, flowability is liable to be lacked to hinder molding. Advantageous effects of the present invention can be effectively exhibited by incorporating the cellulose microfibrils into the composition in the range as described above.

<Other Addition Component>

Into the polyolefin resin of the present invention, in addition to the above-described materials, other addition components can be appropriately incorporated in the range in which the above-described purpose is not adversely affected, such as an antioxidant, a light stabilizer, a radical scavenger, an ultraviolet absorber, a colorant (dye, organic pigment, inorganic pigment), a filler, a slipping agent, a plasticizer, a processing aid such as an acrylic processing aid, a foaming agent, a lubricant such as paraffin wax, a surface treatment agent, a nucleating agent, a releasing agent, a hydrolysis inhibitor, an anti-blocking agent, an antistatic agent, an anticlouding agent, a fungicidal agent, an ion trapping agent, a flame retardant and a flame retardant aid.

Specific examples of the antioxidant and a deterioration inhibitor include a phenol-based antioxidant, a phosphorus-based antioxidant, a sulfur-based antioxidant, a hydroxylamine-based antioxidant and an amine-based antioxidant, and in the phenol-based antioxidant, a hindered phenol-based compound having a t-alkyl group in an ortho position is preferable.

Specific examples of the phenol-based antioxidant include tetrakis[methylene-3-(3',5'-di-t-butyl-4-hydroxyphenyl)propionate]methane, octadecyl-3-(3,5-di-t-butyl-4-hydroxyphenyl)propionate, 3,9-bis[2-{3-(3-t-butyl-4-hydroxy-5-methylphenyl)propionyloxy}-1,1-dimethylethyl]-2,4,8,10-tetraoxaspiro[5.5]undecane, triethyleneglycol-N-bis-3-(3-t-butyl-5-methyl-4-hydroxyphenyl)propionate, 1,6-dihydroxyhexandiol bis[3-(3,5-di-t-butyl-4-hydroxyphenyl) propionate] and 2,2-thiobis-diethylene bis[3-(3,5-di-t-butyl-4-hydroxyphenyl)propionate], and further preferably include 3,9-bis[2-{3-(3-t-butyl-4-hydroxy-5-methylphenyl) propionyloxy}-1,1-dimethylethyl]-2,4,8,10-tetraoxaspiro [5.5]undecane, lauryl-3,5-t-butyl-4-hydroxy benzoate, palmityl-3,5-t-butyl-4-hydroxybenzoate, stearyl-3,5-t-butyl-4-hydroxy benzoate, behenyl-3,5-t-butyl-4-hydroxy benzoate, and 2,4-di-t-butyl-phenyl-3,5-di-t-butyl-4-hydroxy benzoate and tocopherols.

Specific examples of the phosphorous-based antioxidant include tris(nonylphenyl)phosphite, tris(2,4-di-t-butylphenyl)phosphite, distearylpentaerythritol diphosphite, bis(2,4-di-t-butylphenyl)pentaerythritol diphosphite, bis(2,4-di-t-butyl-6-methylphenyl)pentaerythritol diphosphite, bis(2,6-di-t-butyl-4-methylphenyl)pentaerythritol diphosphite, bis (2,4-dicumylphenyl)pentaerythritol diphosphite, tetrakis(2, 4-di-t-butylphenyl)-4,4'-diphenylene diphosphonite, 2,2'-methylene bis(4,6-di-t-butylphenyl)-2-ethylhexyl phosphite, 2,2'-ethylidene bis(4,6-di-t-butylphenyl)fluoro phosphite, bis(2,4-di-t-butyl-6-methylphenyl)ethyl phosphite, 2-(2,4,6-tri-t-butylphenyl)-5-ethyl-5-butyl-1,3,2-oxaphosphorinane, 2,2',2'-nitrilo[triethyl-tris(3,3',5,5'-tetra-t-butyl-1,1'-biphenyl-2,2'-diyl)phosphite, and 2,4,8,10-tetra-t-butyl-6-[3-(3-methyl-4-hydroxy-5-t-butylphenyl)propoxy] dibenzo[d, f][1,3,2]dioxaphosphepine.

Specific examples of the sulfur-based antioxidant include dilauryl 3,3'-thiodipropionate, tridecyl 3,3'-thiodipropionate, dimyristyl 3,3'-thiodipropionate, distearyl 3,3'-thiodipropionate, laurylstearyl 3,3'-thiodipropionate, neopentanetetrayl tetrakis(3-laurylthiopropionate) and bis[2-methyl-4-(3-n-alkyl(an alkyl having 12 to 14 carbon atoms) thiopropionyloxy)-5-t-butylphenyl] sulfide.

Specific examples of the light stabilizer include a hindered amine light stabilizer having a molecular weight of 1000 or more (a light stabilizer having a 2,2,6,6-tetramethylpiperidine skeleton in the molecule).

Specific examples of the ultraviolet absorber include a benzotriazol-based compound, a triazine-based compound, a benzophenone-based compound, a salicylate-based compound, a cyanoacrylate-based compound and a nickel-based compound.

Specific examples of the colorant include carbon black, an inorganic pigment and an organic pigment. Specific examples of the carbon black include furnace black, channel black, acetylene black and lamp black. Specific examples of the inorganic pigment include black iron oxide, red iron oxide, titanium oxide, cadmium red, cadmium yellow, ultramarine blue, cobalt blue, titan yellow, red lead, yellow lead and iron blue. Specific examples of the organic pigment include quinacridone, polyazo yellow, anthraquinone yellow, polyazo red, azolake yellow, perylene, phthalocyanine green, phthalocyanine blue and isoindolinone yellow. These colorants may be used singly or two or more kinds thereof may be used in combination.

As a filler, silica, hydroxyapatite, alumina, titania, boehmite, talc, metal compound such as calcium carbonate, and the like are preferably exemplified.

<Production Method of Molded Article>

The molded article is prepared according to the methods described in JP-A-2006-44264, JP-A-2007-186687, JP-A-2009-196435, JP-A-2013-230716 and JP-T-2009-532574 or a method similar to those methods.

<<Qualities of Polyolefin Resin Composition and Molded Article>>

The polyolefin resin composition or molded article of the present invention preferably has a coefficient of linear thermal expansion, a rigidity, and a fluidity within the ranges described below.

<Coefficient of Linear Thermal Expansion>

In the polyolefin resin composition of the present invention, a coefficient of linear thermal expansion at 25° C. is preferably 85 ppm/K or less, and further preferably 75 ppm/K or less. The coefficient of linear thermal expansion is preferably as small as possible, but is practically 30 ppm/K or more.

The coefficient of linear thermal expansion refers to, when a length of a specimen in a uniaxial direction is changed by linear expansion as caused by a temperature rise, a proportion of change ratios relative to the temperature change, and is calculated from the following formula.

$$\alpha = (dl/dT)/I_0$$

Here, $\alpha$ denotes a coefficient of linear thermal expansion, $dl$ denotes a change in a length of a specimen, $dT$ denotes a change in temperature, and $I_0$ denotes a length of a specimen at room temperature or 0° C., but in the present invention, $I_0$ is a length of a specimen at room temperature of 25° C.

The coefficient of linear thermal expansion is expressed in terms of a value per 1 K (Kelvin), and can be determined based on JIS K 7197 "Testing method for linear thermal expansion coefficient of plastics by thermomechanical analysis".

In the present invention, a stable composite material can be produced by adjusting the coefficient of linear thermal expansion to the above-described range. In particular, in the present invention, the cellulose microfibrils can be uniformly dispersed into the polyolefin resin by using the cellulose microfibrils in the above-described content, and therefore the coefficient of linear thermal expansion can be adjusted to the above-described range.

<Rigidity>

In the molded article of the present invention, a flexural modulus at 25° C. is preferably 2.0 GPa or more, further preferably 2.2 GPa or more, and particularly preferably 2.5 GPa or more. The modulus is preferably as large as possible, but is practically 10 GPa or less.

The flexural modulus can be determined based on JIS K 7171 "Plastics-Determination of flexural properties."

By setting the flexural modulus within the above-described range, deformation of the molded article can be prevented in a case where the molded article is used under an environment of high temperature and high humidity or the like, and therefore such a case is preferable.

<Flowability>

In the polyolefin resin composition of the present invention, apparent shear viscosity at 190° C., in which an apparent shear rate is 2430 mm/s, is preferably 800 Pa·sec or less, further preferably 500 Pa·sec or less, and still further preferably less than 500 Pa·sec. The apparent shear rate is preferably as small as possible, but is practically 10 Pa·sec or more.

The apparent shear viscosity refers to physical properties when the sample flows out from a heated barrel through a capillary, and can be determined by measuring the sample by an apparatus having a die length of 20 mm and a die diameter of 1 mm based on JIS K 7199 "Thermoplastics-Determination of the flowability of plastics using capillary and slit-die rheometers."

Productivity of the molded article can be improved by adjusting the flowability within the above-described range, and also rigidity upon applying as the molded article can be adjusted within the above-described range, and such a case is preferable.

<<Molded Article to be Formed by Polyolefin Resin Composition>>

Specific examples of an application of the molded article to be formed by the polyolefin resin composition of the present invention include a material for a vehicle such as an automobile and a two-wheeled vehicle, a structural member of a robot arm, a robot part for amusement, a prosthesis member, a material for electrical appliances, an OA device housing, a building material member, drainage facilities, a toiletry material, various tanks, a container, a sheet, a toy and sport goods.

Specific examples of the material for the vehicle include an interior part such as a door trim, a pillar, an instrumental panel, a console, a rocker panel, an armrest, an inner panel of door, a spare tire cover and a door knob, an exterior part such as a bumper, a spoiler, a fender, a side step and an outer panel of door, other parts such as an air intake duct, a coolant reserve tank, a radiator reserve tank, a window-washer tank, a fender liner and a fan, and an integrally molded part such as a front-end panel.

Among them, in the present invention, an outer panel for a vehicle, particularly an inner panel or an outer panel of a back door for a vehicle, or a vertical outer panel such as a front panel of a rear spoiler or a fender is preferable.

In particular, with regard to the inner panel or the outer panel of the back door for the vehicle, in place of the resins described in JP-A-2009-196435, JP-A-2011-088476 and JP-A-2013-230716, the polyolefin resin composition is preferably applied to the inner panel or the outer panel of the back door for the vehicle as described in these patent gazettes. Moreover, with regard to the front panel of the rear spoiler or the fender, the polyolefin resin composition can be preferably applied to the front panel of the rear spoiler or the fender described in JP-T-2009-532574.

In addition thereto, for example, the thermoplastic resin layer described in JP-A-2006-044264 is formed by using the polyolefin resin composition of the present invention. Thus, the resultant material can be preferably applied as the decorative molded body described in the gazette.

EXAMPLES

The present invention is described in more detail based on examples given below, but the present invention is not limited by the following examples.

The materials used are described.

Polyolefin Resin

Polypropylene resin (trade name: PrimePolypro J708UG, manufactured by Prime Polymer Co., Ltd.)

Cellulose Microfibrils

Cellulose nanofibers BiNFi-s (AMa-10002), manufactured by SUGINO MACHINE LIMITED Example 1

A polyolefin resin composition was obtained by using 100 parts by mass of the above-described polypropylene resin (Prime Polypro J708UG, manufactured by Prime Polymer Co., Ltd.), and hydrophobizing 0.5 part by mass of the above-described cellulose microfibrils [BiNFi-s (AMa-10002, manufactured by Sugino Machine Limited.], and kneading the resultant materials in a twin-screw extruder.

The polyolefin resin composition obtained was molded into a sheet having a dimension of 10 mm×80 mm×4 mm (thickness) by using an injection molding machine (trade name: ROBOSHOT α-30C, manufactured by Fanuc Corporation).

Examples 2 to 12 and Comparative Examples 1 to 3

Polyolefin resin compositions of Examples 2 to 12 and Comparative examples 1 to 3 were prepared in the same manner as Example 1, except changing the contents as shown in the following Table 1, and sheets having a dimension of 10 mm×80 mm×4 mm were prepared in the same manner as Example 1.

[Evaluation Method of Molded Article]

The molded articles (sheets) prepared by using the polyolefin resin compositions in Examples 1 to 12 and Comparative examples 1 to 3 each were evaluated were evaluated in the following items. The results are shown in the following Table 1.

<Flexural Modulus (Rigidity)>

The sheets prepared in Examples 1 to 12 and Comparative examples 1 to 3

Measurement was carried out on each sheet having a dimension of 4 mm (thickness)×10 mm (width)×80 mm which was obtained by molding using an injection molding machine (ROBOSHOT α-30C, manufactured by Fanuc Corporation) under conditions of a test speed of 2 mm/min, a span of 64 mm, and a measurement temperature of 25° C. in accordance with JIS K 7171.

The criteria of flexural modulus are described below.
A: 2.2 GPa or more
B: 2.0 GPa or more and less than 2.2 GPa
C: less than 2.0 GPa or less <Fluidity>

Measurement was carried out under the following conditions by using CAPIROGRAPH 1C manufactured by Toyo Seiki Seisaku-Sho Ltd. as a measuring apparatus in accordance with JIS K 7199 (1999).
temperature: 190° C. (using camber for keeping temperature)
dice: length=20 mm, diameter=2 mm
apparently shear velocity=2,430 mm/s
mass of sample: 15 to 20 g The criteria of flexural fluidity are described below.
A: less than 500 Pa·sec
B: 500 Pa·sec or more and 800 Pa·sec or less
C: more than 800 Pa·sec <Coefficient of Linear Thermal Expansion>

From the above-described bending specimen, a prismatic specimen having a length of 10 mm and one side of 5 mm was cut with a single edge, and the obtained specimen was measured under conditions of 0 to 50° C. in accordance with JIS K 7197 to determine a coefficient of linear thermal expansion at 25° C.

The criteria of coefficient of linear thermal expansion are described below.
A: less than 75 ppm/K
B: 75 ppm/K or more and 85 ppm/K or less
C: more than 85 ppm/K The obtained results all are shown in the following Table 1.

parts by mass relative to 100 parts by mass of total resin components, as shown in Comparative Examples 2 and 3, the flowability at a high temperature (190° C.) was deteriorated.

Therefore, it is found that the resin compositions in Comparative Examples 1 to 3 are unsuitable as an outer panel for a vehicle.

From the above-described results, the polyolefin resin composition of the present invention can be preferably applied to the material for the vehicle, particularly to the outer panel for the vehicle, above all, to a front panel of a rear spoiler for the vehicle or a fender for the vehicle. Further, the polyolefin resin composition of the present invention exhibits mechanical strength and characteristics according to which the composition can be used in an inner panel and an outer panel of a back door for the vehicle. Therefore, penetration or the like by a difference in rigidity can be prevented from occurring by producing both of these panels by using the polyolefin resin composition of the present invention.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. An injection molded article comprising a polyolefin resin composition, comprising:
   a polyolefin resin; and
   cellulose microfibrils,
   wherein the polyolefin resin comprises a propylene block copolymer and is a polypropylene resin for injection molding and the cellulose microfibrils are cellulose nanofibers having a width of 4 to 100 nm,
   wherein a melt flow rate of the polyolefin resin is 10 to 150 g/10 minutes;

TABLE 1

| Items of component and property | Kind | CEx 1 | Ex 1 | Ex 2 | Ex 3 | Ex 4 | Ex 5 | Ex 6 | Ex 7 | Ex 8 | Ex 9 | Ex 10 | Ex 11 | Ex 12 | CEx 2 | CEx 3 |
|---|---|---|---|---|---|---|---|---|---|---|---|---|---|---|---|---|
| Resin component | Polyolefin resin (parts by mass) | 100 | 100 | 100 | 100 | 100 | 100 | 100 | 100 | 100 | 100 | 100 | 100 | 100 | 100 | 100 |
| | Cellulose microfibrils (parts by mass) | 0.0 | 0.5 | 0.8 | 1.1 | 2.2 | 2.5 | 3.6 | 5.0 | 5.2 | 10.0 | 11.1 | 16.5 | 19.7 | 20.6 | 25.5 |
| Property | Rigidity (flexural modulus at 25° C.) | C | B | B | A | A | A | A | A | A | A | A | A | A | A | A |
| | Flowability (shear viscosity at 190° C.) | A | A | A | A | A | A | A | A | A | A | B | B | B | C | C |
| | Coefficient of linear thermal expansion at 25° C. | C | B | B | B | B | A | A | A | A | A | A | A | A | A | A |

Ex: Example
CEx: Comparative example

From the above-described Table 1, it was found that all of the molded articles molded by using the polyolefin resin compositions of the present invention in Examples 1 to 12 have excellent rigidity, flowability at a high temperature (190° C.), and a low coefficient of linear thermal expansion, and it was also found that the cellulose microfibrils were uniformly dispersed into a polyolefin resin.

In contrast, if the polyolefin resin only is applied without containing the cellulose microfibrils, as shown in Comparative Example 1, the rigidity was significantly low, and the coefficient of linear thermal expansion was high. Conversely, if the content of cellulose microfibrils was over 20 wherein a content of the cellulose microfibrils is 2.5 to 10 parts by mass, with respect to 100 parts by mass of an entire resin component in the polyolefin resin composition;

wherein
(i) a coefficient of linear thermal expansion at 25° C. is less than 75 ppm/K;
(ii) a flexural modulus at 25° C. is 2.2 GPa or more; and
(iii) an apparent shear viscosity at 190° C., in which an apparent shear rate is 2430 mm/s, is less than 500 Pa·sec, wherein the polyolefin resin further comprises a propylene homopolymer, and wherein the propylene block copolymer is selected from the group consisting of:
- a (propylene)-(propylene-ethylene) copolymer,
- a (propylene)-(propylene-ethylene-1-butene) copolymer,
- a (propylene)-(propylene-ethylene-1-hexene) copolymer,
- a (propylene)-(propylene-1-butene) copolymer,
- a (propylene)-(propylene-1-hexene) copolymer,
- a (propylene-ethylene)-(propylene-ethylene) copolymer,
- a (propylene-ethylene)-(propylene-ethylene-1-butene) copolymer,
- a (propylene-ethylene)-(propylene-ethylene-1-hexene) copolymer,
- a (propylene-ethylene)-(propylene-1-butene) copolymer,
- a (propylene-ethylene)-(propylene-1-hexene) copolymer,
- a (propylene-1-butene)-(propylene-ethylene) copolymer,
- a (propylene-1-butene)-(propylene-ethylene-1-butene) copolymer,
- a (propylene-1-butene)-(propylene-ethylene-1-hexene) copolymer,
- a (propylene-1-butene)-(propylene-1-butene) copolymer and
- a (propylene-1-butene)-(propylene-1-hexene) copolymer.

2. The injection molded article according to claim 1, which is an outer panel for a vehicle.

3. The injection molded article according to claim 1, which is a front panel of a rear spoiler for a vehicle, or a fender.

4. A back door for a vehicle, comprising the injection molded article according to claim 1 as an inner panel.

5. A back door for a vehicle, comprising the injection molded article according to claim 1 as an outer panel.

6. A back door for a vehicle, comprising the injection molded article according to claim 1 as an inner panel and an outer panel.

* * * * *